United States Patent [19]

Hoy et al.

[11] Patent Number: 5,171,772

[45] Date of Patent: Dec. 15, 1992

[54] MICRO COMPOSITE SYSTEMS AND PROCESSES FOR MAKING SAME

[75] Inventors: Kenneth L. Hoy, Kanawha; Charles W. Glancy, South Charleston; Jeffrey M. O. Lewis, Charleston, all of

[73] Assignee: Union Carbide Chemicals & Plastics Technology Corporation, Danbury, Conn.

[21] Appl. No.: 319,415

[22] Filed: Mar. 6, 1989

Related U.S. Application Data

[63] Continuation-in-part of Ser. No. 109,326, Oct. 19, 1987, abandoned.

[51] Int. Cl.$^5$ ................................................. C08J 3/03
[52] U.S. Cl. .................................... 524/457; 524/458; 524/827; 524/833
[58] Field of Search ................ 524/827, 833, 457, 458

[56] References Cited

U.S. PATENT DOCUMENTS

| | | | |
|---|---|---|---|
| 3,133,893 | 5/1964 | Newman | 260/41 |
| 3,544,500 | 12/1970 | Osmond et al. | 260/29.6 |
| 3,580,880 | 5/1971 | Clarke et al. | 260/29.6 R |
| 3,716,505 | 2/1973 | Ohe et al. | 260/174 |
| 4,194,920 | 3/1980 | Burke, Jr. et al. | 106/308 |
| 4,349,389 | 9/1982 | Schofield | 106/308 |
| 4,413,073 | 11/1983 | Gibson et al. | 523/511 |
| 4,421,660 | 12/1983 | Solc nee Hajna | 252/62.54 |
| 4,426,485 | 1/1984 | Hoy et al. | 524/591 |
| 4,507,422 | 3/1985 | Farrar et al. | 524/425 |
| 4,608,401 | 8/1986 | Martin | 523/205 |
| 4,616,058 | 10/1986 | Yabuta et al. | 524/461 |
| 4,680,200 | 7/1987 | Solc | 427/213.34 |
| 4,749,506 | 6/1988 | Kitahara et al. | 252/62.54 |
| 4,771,086 | 9/1988 | Martin | 523/205 |

OTHER PUBLICATIONS

Wu, et al., "Characterization by Ellipsometry of Polymerized Ultra Thin Films Formed in a Two-Dimensional Solvent on an Oxide Surface", *Colloids and Surfaces*, 26, pp. 155-169 (1987).

Parfitt, et al., editors, "Adsorption from Solution at the Solid/Liquid Interface", *Academic Press* (1983) p. 141.

*Chemical Abstracts*, vol. 91 (8): 58612W, abstracting West German patent application 2,745,872.

Wu, J., et al., "Two-Dimensional Reaction Solvents: Surfactants Bilayers in the Formation of Ultrathin Films", *Langmuir*, Issue 3 (1987) pp. 531-537.

*Primary Examiner*—Paul R. Michl
*Assistant Examiner*—LaVonda DeWitt
*Attorney, Agent, or Firm*—Sharon H. Hegedus

[57] ABSTRACT

A coating of hydrophobic polymer is prepared by contacting a substrate with an aqueous media containing amphiphilic polymer and polymerizing polymerizable component to provide the hydrophobic polymer coating. The processes can be used to make stable dispersions of particles, such as pigments, for paint compositions.

15 Claims, 2 Drawing Sheets

MICRO COMPOSITE SYSTEMS AND PROCESSES FOR MAKING SAME

This is a continuation-in-part of U.S. Ser. No. 109,326, filed Oct. 19, 1987, herein incorporated by reference, now abandoned.

FIELD OF THE INVENTION

This invention relates to composite solids, especially particulate solids, dispersions of particulate solids in which the particles preferably have a mean diameter of generally 2 microns or less, to stable water-based systems, i.e., paints, coatings, inks and the like, containing said dispersions, and also to methods used to prepare said composite solids, especially particulate solids, dispersions and water-based systems containing same.

BACKGROUND

A great amount of effort has been expended heretofore in attempting to encapsulate or coat materials with polymer. One field of endeavor has been to encapsulate finely divided materials such as metals, metal oxides, pigments, fillers, and inorganic and organic particulates in general having a mean particle diameter of generally 2 microns or less. Many assertions have been made heretofore that the individual pigment particles have been coated with polymers, such as thermoplastic addition polymers, in order to prevent the particles from agglomerating and ultimately settling out of dispersions containing them. Additionally, attempts were made to encapsulate pigment particles for the purpose of improving paint properties including stability, gloss, hiding power, etc. The coated or alleged encapsulated particles, in many instances, were disclosed as useful in a wide variety of applications such as in the pigmented paint field as mentioned above or as electroconductive additives to plastics and other materials, toners for use in electrophotographic uses as well as many other applications.

Newman in U.S. Pat. No. 3,133,893 discloses pigment particles coated with a polymer which is polymerized in situ by stabilizing pigment particles of less than 1.5 microns, mostly between 0.01 and 0.5 microns, in an aqueous medium in which an emulsion polymerization is carried out to form the polymer coating. The dispersion is formed with a suitable dispersant which may be cationic, anionic or nonionic. The patentee states at column 3, line 45: "In general, the type of dispersant is immaterial." Newman discloses stabilization of the pigment against agglomeration by means of the polymer coating on the individual pigment particles.

Osmond, et al., in U.S. Pat. No. 3,544,500 disclose a complex process for encapsulating solid particles, e.g., pigments. The process involves first adsorbing a polymer on the surface of the particles and providing a stabilizer having an anchor group which becomes associated with the adsorbed polymer on the surface and a pendant hydrophilic component solvated by the aqueous phase and so provides a stabilizing sheath around the particles. The pretreated particles can then be subjected to aqueous emulsion polymerization of a monomer in an aqueous phase to effect the encapsulation. The polymer to be adsorbed on the surface is soluble in an aqueous medium containing the particles and a modification is effected to make the polymer insoluble. The patentees disclose at column 3, lines 67 et seq., that the polymer to be adsorbed should contain strong polar groups to promote adsorption on the surface of the particles. At column 2, lines 1, et seq., the patentees state:

"The particles may be dispersed in a solution of the polymer and stabilizer in the liquid but preferably they are dispersed in a solution of the polymer in the liquid, the stabilizer being added after dispersion of the particles. In the second stage of the preparatory treatment the nature of the solution is modified so that the adsorbed polymer is no longer soluble in the liquid continuous phase but the chain-like hydrophilic component of the stabilizing compound remains solvated by it. As a result of the modification of the solution the anchor component of the stabilizer becomes associated with the now insoluble polymer adsorbed on the disperse particles whilst the other chain-like component remains solvated by the liquid forming the continuous phase and provides a stabilizing sheath around the particles. The stabilizer may be added before the modification of the solution or at the same time as the modification takes place."

The patentees further state at column 3, lines 31, et seq., that:

"In general, because of the need to modify the solution containing the stabilizer, the stabilizer will be a non-ionic one providing a steric stabilizing sheath around the particles. Optionally such nonionic stabilizers may be supplemented by ionic types . . . and these ionic types are preferably added after that [preparatory]stage."

Clarke, et al., in U.S. Pat. No. 3,580,880 disclose allegedly stable dispersions and the preparation of same. Particulate solids are said to be dispersed in a liquid with a polymer comprising one chain-like lipophilic pendant component which is capable of being solvated in a lipophilic liquid and at least one nonionic chain-like component which is solvated by a hydrophilic liquid to effect what the patentees refer to as an entropic stabilization (Column 2, lines 15 to 33). The polymer may comprise as the hydrophilic component non-ionic chain-like components with a molecular weight of 350-5000 and the lipophilic component is sufficiently long to provide a barrier 12 Angstroms in thickness around the particles.

Schofield in U.S. Pat. No. 4,349,389 describes dispersible inorganic pigment compositions in which the surface of the finely divided inorganic pigment particles is coated with a substance rendering the surface hydrophobic ("hydrophobing agent"), said substance preferably being an amphiphile containing one or more hydrophobic chains of carbon atoms interrupted by O, N or S atoms, and one or more hydrophilic groups such as amino groups, quaternary ammonium groups, carboxylic groups, etc. wherein the hydrophilic group or groups anchors the hydrophobic chain to the pigment surface and a layer of a thermoplastic polymer evenly covers and adheres to the hydrophobic chain.

Solc in U.S. Pat. No. 4,421,660 discloses aqueous dispersions of polymer coated particles, including titanium dioxide pigment particles, produced by first emulsifying polymerizable monomers with a chemical dispersant and/or surfactant and then polymerizing the monomer and coating the particles with the polymer resulting from the polymerization. The patentee discloses the use of high shear conditions, e.g., produced by an ultrasonic probe, to effect a colloidal dispersion of particles. Typically, the dispersion of solid particles is permitted to stand overnight after which the top layer of colloidal dispersed pigment is decanted and used in an emulsion polymerization. The encapsulated particles are particularly intended for applications requiring a colloidal size particulate having magnetic properties. The percent solids contents of the encapsulated particles set forth in the examples were too low without concentration for practical use in the manufacture of water-based paint.

Inspection of a photomicrograph (Sample No. 0) of allegedly encapsulated pigment presented by Solc during the prosecution of the patent application reveals titanium dioxide particles of about 0.2 to 0.3 micron in diameter with a much greater number of polymer spheres of about 0.03 to 0.05 micron in diameter. A portion of these polymer particles appears to be stuck to the perimeter of the titanium dioxide particles. The appearance of the coating suggests that Solc conducted an emulsion polymerization to produce very fine polymer particles and some of these polymer particles contacted and stuck to the surface of the titanium dioxide particles, i.e., no selective polymer growth appears to have occurred at the titanium dioxide surface. The use of sonication and very large amounts of surfactant which readily forms micelles are expected to promote the formation of very small emulsion polymerization particles of the type depicted by Solc.

Farrar, et al., in U.S. Pat. No. 4,507,422 describe aqueous dispersions of pigments containing as a dispersing agent a water soluble polymer having a polydispersity of below 1.5 (i.e., a narrow molecular weight range) and a molecular weight in the range of about 1000 to 5000. The preferred polymers are polymers of acrylic acid (or copolymers) with 2-acrylamido-2-methyl propane.

Martin in U.S. Pat. No. 4,608,401 describes finely divided water insoluble particles free of ionic charges and states that the particles are given a generally uniform polymeric encapsulation. The patent states that such materials are obtained by mixing in an aqueous reaction medium a water insoluble monomer polymerizable to form a generally water insoluble polymer free of ionic charges in the presence of a nonionic surface active stabilizing agent, thereafter polymerizing the monomer using a redox polymerization initiating system which is free of ionic groups and does not decompose to release ionic groups in the reaction medium. The patent also states that naturally agglomerated particulate materials are effectively dispersed in situ during polymerization thereby eliminating the need for preliminary grinding and/or dispersion treatments. The patentee emphasizes that the medium be substantially free from anionic or cationic surface active or dispersing agent. The non-ionic stabilizing agent is said to have sufficient hydrophilic-lipophilic power to possess good emulsifying action and have an HLB of at least about 13. The patentee broadly discloses alkylphenyl and derivatives thereof as lipophilic components and ethylene oxide chains as hydrophilic groups, i.e., from about 10 to up to 200 or more —$(CH_2CH_2O)$— groups. Nonylphenol ethoxylates are the only agents used in the examples.

Solc in U.S. Pat. No. 4,680,200 describes the encapsulation of organic pigment solids in a hydrophobic polymer made by dispersing the monomer in an aqueous colloidal dispersion of the organic particles followed by emulsion polymerization.

Gibson, et al., in U.S. Pat. No. 4,413,073 disclose stable aqueous film-forming dispersions. The dispersions are said to be stable to harsh processing such as ball-milling and sand grinding which are sometimes necessary for the incorporation of certain pigments. See column 6, lines 8 to 18. The patentees do not disclose encapsulating particulate solids. Rather, the disclosure pertains to dispersions of particles of film-forming polymer such as alkyd resin in the presence of a stabilizing compound having an HLB value of at least 8 and whose lipophilic portion comprises at least one ethylenic double bond.

Daniel, et al., in European Patent Application 38730 disclose fine iron oxide ($Fe_3O_4$) particles (less than 0.01 microns) emulsified in an anionic agent (e.g., ($C_{12}H_{25}OSO_3Na$)) and non-ionic surfactant, e.g., ethoxylated adduct of nonylphenol having 30 ethylene oxide units.

Kitahara, et al., in U.S. Pat. No. 4,749,506 disclose a water-in-oil microgel dispersion in which a surface active agent is adsorbed or adhered onto a gel consisting of a fine particle substance and a polymer. The microgel is water-insoluble but is capable of being dispersed in both aqueous and oily solvents. The disclosed surface active agents are ethoxylated adducts of phenol derivatives wherein the ethylene oxide chain is 1 to 20 units in length.

Hoy, et al., in U.S. Pat. No. 4,426,485 disclose thickening agents comprising water-soluble, thermoplastic, organic polymer having segments of bunched monovalent hydrophobic groups. These thickening agents can find application to alter wetting characteristics of particulate materials and aid in suspending particulate materials in aqueous solutions.

Daubach, et al., in West German patent application 2,745,872, disclose dispersing agents for dyes and fluorescent brighteners which agents have the structure

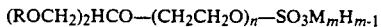

$$(ROCH_2)_2HCO—(CH_2CH_2O)_n—SO_3M_mH_{m-1}$$

where R is phenyl, $C_{1-18}$ alkylphenyl, di-$C_{1-8}$-alkylphenyl, tri-$C_{1-4}$-alkylphenyl, mono-, bis-, or tris (alpha-phenylethyl)phenyl, M is alkali metal cation or ammonium ion, n is 75 to 700 and m is 0 or 1.

Advantageously, processes for the polymeric encapsulation of finely-divided particles, e.g., pigments, are accomplished in a cost effective, efficient and environmentally-acceptable manner. Accordingly, aqueous media are the desired menstrua in which to conduct the polymerization process to encapsulate the particles. Polymerization from aqueous phases can result in the formation of precipitated polymer separate from the particles intended to be encapsulated. Thus, these new polymer particles represent a loss of efficiency in the encapsulation process. Hence, processes are sought which tend to minimize or reduce the creation or nucleation of new polymer particles. Moreover, the encapsulation process should be relatively non-complex in order to enhance its attractiveness for commercial operations. Unfortunately, the heretofore disclosed processes for encapsulation of particles in aqueous media frequently tended to have one or more shortcomings, e.g., complexity in that several preteatment steps were required to provide particles suitable for encapsulation, and even then excessive creation or nucleation of new polymer particles occurred reducing the efficiency of the encapsulation.

SUMMARY OF THE INVENTION

The present invention relates to processes whereby a high molecular weight polymer is formed in the presence of an aqueous medium on solid surfaces. The processes are particularly attractive for encapsulating solid particles in dispersion in the aqueous medium. In accordance with the invention, the polymer effectively coats, or encapsulates, the particles without excessive creation or nucleation of new polymer particles. In effect, the process creates solid composites containing the original solid coated by the polymer.

In accordance with this invention, solid surfaces capable of adsorbing hydrophilic polymers are contacted with an aqueous medium containing a sufficient amount of polymeric amphiphile (amphiphilic polymer) having a hydrophilic backbone which is a hydrocarbyl-containing chain having a weight average molecular weight of at least about 3000 and having a hydrophilic moiety on average less than 2.5 carbon atoms apart, preferably said backbone has a hydrophilicity equivalent to at least about $-(CH_2CH_2O)-_{70}H$, and said backbone having at least one lipophilic segment pendant therefrom such that the amphiphilic polymer exhibits an LHB value, hereinafter defined, of greater than about 1.5, preferably greater than about 2, to enhance compatibility of the surface of the solid with lipophobic components. The solid having contacted the amphiphilic polymer can be coated with hydrophobic polymer while the particles are in contact with an aqueous medium. The hydrophobic polymer is formed by polymerizing polymerizable components provided to the aqueous medium. In many instances, the inclusion of a minor amount of a non-ionic surfactant during the emulsion polymerization is desirable to enhance the quality of the polymeric coating. The surfactants generally have a hydrophilic component less hydrophilic (in terms of $-CH_2CH_2O-$ groups) than the hydrophilic backbone of the polymeric amphiphile.

One particularly attractive use of the processes of this invention is to encapsulate finely divided particles, i.e., of a size capable of being dispersed in an aqueous medium, and, preferably, the coating or encapsulation is effected with the particles being dispersed in the aqueous medium. With small particles, i.e., below about 2 microns, the amphiphilic polymer used in the processes of this invention may also serve to enhance the stability of the dispersion of both the uncoated and coated particles. An aspect of this invention pertains to coating compositions comprising solid particles having been coated in accordance with a process of this invention, which particles are dispersed in a liquid which does not unduly swell the polymeric coating.

A further aspect of this invention pertains to solid composites having a coating comprising hydrophobic polymer having dispersed therewith polymeric amphiphile.

In yet a further aspect of this invention, the polymeric amphiphile has a backbone with a hydrophilicity equivalent to at least about $-(CH_2CH_2O)-_{70}$ units. Preferably, the polymeric amphiphile is comprised of $-(CH_2CH_2O)-$ units.

In a still further aspect of the invention, the polymeric amphiphile is a polymeric associative thickener comprising a polymer having a weight average molecular weight of at least about 10,000 and, in the average molecule, a hydrophilic backbone and an average of more than one pendent hydrophobic group connected to said hydrophilic backbone and, generally, a non-ionic surfactant is present when polymerizing to form the hydrophobic polymer coating on the surface of the particle.

Another aspect of the present invention concerns stable aqueous dispersions suitable for manufacture of highly stable, water-based systems which are capable of providing dried films having high hiding power and gloss. The high hiding power enables the paint manufacturer to substantially reduce levels of the more expensive hiding pigments thereby reducing costs of each gallon of paint produced.

DETAILED DESCRIPTION a. Overview

Figure 1:
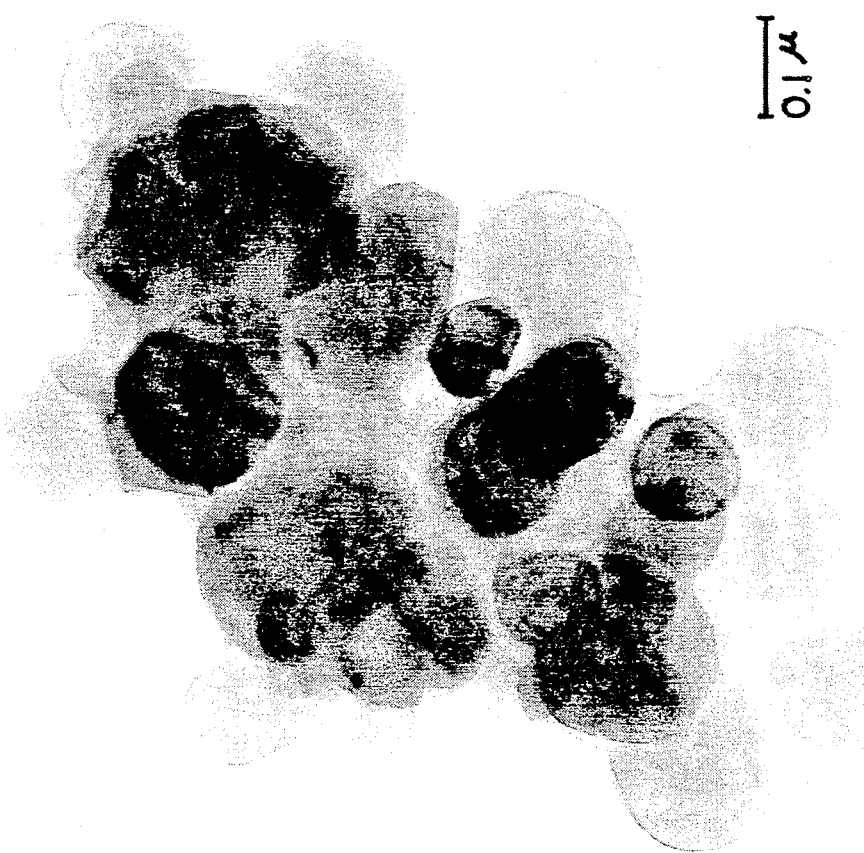
FIG. 1 is a transmission electron photomicrograph of a titanium dioxide pigment encapsulated with hydrophobic polymer in accordance with this invention.

The exact means by which the hydrophobic polymer forms the coating on a substrate surface in contact with an aqueous media in the processes of this invention is not completely understood. Two of the possible ways by which the coating can occur are: (1) Polymerization could occur by an epitaxial polymerization of the polymerizable component, e.g., monomer, absorbed in the hydrophobic zone defined, at least in part, by the amphiphilic polymer which itself is adsorbed on the "surface" of the substrate; or (2) In the case of partially water soluble monomers, e.g., vinyl acetate (wherein water solubility is further enhanced by the 50° C. or higher polymerizing temperatures used and also by the use of propylene glycol), polymerization may begin in the aqueous phase and the growing polymer chain, as it reaches the size where it is no longer even partially soluble in water, adsorbs on the surface of the dispersed solid particulate phase without the nucleation of new polymer particles.

In the present invention it is believed that the highly polar water soluble backbone or segments of the amphiphilic polymer adsorbs on the surface of polar solid surfaces of the substrate. It is well known that hydrophilic polymers such as polyethylene oxide, hydroxyethyl cellulose, etc. are adsorbed on the surfaces of clays, metal oxides and the like; however the amphiphilic polymer also contains non-polar moieties, often attached in a pendant manner to the water-soluble polymeric backbone, which must be oriented by geometrical constraints away from the substrate surface. The net effect of the amphiphilic polymer then is to create a dynamic hydrophobic zone which is energetically unstable in the aqueous environment and subsequently associates (by hydrophobic bonding) with hydrophobic moieties of other amphiphilic polymer molecules and/or surfactant to form a stabilizing bilayer, or hydrophobic zone. When the substrate is in particulate form, the dispersed particles can be quite stable in the aqueous environment and the hydrophobic zone, which is sandwiched between two water soluble layers.

The hydrophobic zone, which is sandwiched between two water-soluble layers, provides a region where hydrophobic monomers can accumulate and subsequently be polymerized. Wu, et al., in "Characterization by Ellipsometry of Polymerized Ultra-Thin Films Formed in a Two-Dimensional Solvent on an Oxide Surface", *Colloids and Surfaces,* 26, pp. 155-169 (1987) and Parfitt, et al., editors, *Adsorption from Solution at the Solid/Liquid Interface,* Academic Press (1983) p. 141, provide support to the belief that a hydrophobic layer formed by surfactant can exist at the interface of a solid surface and an aqueous medium. While we believe that the bilayer theory described herein makes the invention understandable, we do not limit in any way the scope of the present invention by the suggested mechanisms.

b. The Solids

The solids employed in the present invention have a surface capable of adsorbing hydrophilic polymers, i.e., have a hydrophilic surface, even though the particles may be essentially water insoluble. A surface is hydrophilic when a polyethylene glycol of a molecular weight of about 400 is more strongly adsorbed than benzene. Preferably, the surface is more hydrophilic than silica. Solids having hydrophilic surfaces include those comprised of metal oxides, metal salts such as phosphates, sulfates, and the like and organics having carbonyl, carboxylic, amine, phosphate, urethane, sulfate, sulfonate, phosphonate and the like groups, on at least the surface of the particles. As is well known, metals such as aluminum, iron, titanium, silver and gold oxidize in air and, hence, the surfaces of such materials are hydrophilic in nature. The solid to be coated in accordance with this invention may be composites, e.g., may have coating or layer of a material providing a hydrophilic surface. If a naturally hydrophilic surface has been treated to reduce its hydrophilicity, it may be desirable to treat the surface, e.g., by cleansing, heat treatment, acid treatment, etc., to remove the deleterious agent.

Exemplary of solids are water insoluble solids such as inorganic solids including inorganic pigments such as titanium dioxide, zinc oxide, antimony oxide, magnesium oxide, fly ash, red oxide, glass particles, yellow oxide, lemon chrome and cobalt blue; powders of metals including titanium, copper, brass, gold and stainless steel; carbonates such as calcium and magnesium carbonates; phosphates such as calcium and lead phosphates; silica and silicates such as clay, calcined clay, mica and glass particles; chromates such as lead chromate; metal salts such as silver chloride; inert filler materials such as titanates and talc; ferrites; aluminum hydrates; and the like. Of particular interest are flakes, plate-like structures, fibers and powders of metals and metal alloys such as aluminum, cobalt, iron, copper, nickel, chromium, zinc, palladium, silver, ruthenium, platinum, gold, rhodium, lead and alloys of these metals. Also of interest are the oxides of such metals, particularly magnetic oxides such as iron, nickel, cobalt or alloys thereof, as well as metal oxides, e.g., alumina or silica, or oxides of other elements, such as titanium dioxide and barium oxide, and other inorganic materials such as sulfates such as barium sulfate; dielectric materials such as perovskites, barium titanates, etc.; and electrical conductors including super conductors. The surface of the solid may be of a different composition than the underlying structure. The solid substrate surface may thus be selected to provide the hydrophilic properties, i.e., as composites. Composite solids include, e.g., aluminum having an aluminum oxide surface thereon and conventional titanium dioxide pigments having alumina, silica or alumina and silica coatings thereon.

Other solids that can be employed in this invention are organic pigments such as the essentially water-insoluble organic pigments including the rhodamines, the phthalocycanines and laked pigments, e.g., the azo lakes, as well as those pigments disclosed in U.S. Pat. No. 4,194,920, which is incorporated herein by reference. Other examples of such organic solids are organic fillers, catalysts and the essentially water-insoluble organic fire retardant additives such as decabromodiphenyloxide.

The solids to be coated or encapsulated may be in any desired configuration, e.g., sheets, fibers, particles, flakes, blocks, etc. When in the form of particulate solids, they conveniently are of a size capable of being dispersed in an aqueous medium. Frequently, the particulate solids have an average particle size of less than about 2 microns. For pigments, the particle size is most often below about 1 micron. Advantageously, with pigments that perform by light scattering, particle sizes of between about 0.1 to 0.7 micron are employed. While this invention can provide coated particulate solids for paints, molding resins, and other colorant utilities, the coated particles can find application in electronic, medical and other applications. Hence, the size of the particulate solids will vary depending upon the intended application of the coated particle, and the size may vary from, say, 50 or 100 Angstroms to 50 or 100 or more microns.

c. The Amphiphilic Polymer

In the processes of this invention, the surface to be coated, or encapsulated, by hydrophobic polymer, are contacted with amphiphilic polymer. The amount of amphiphilic polymer is at least sufficient to enhance "Encapsulation Efficiency". "Encapsulation Efficiency" is the weight percent of the hydrophobic polymer that coats the particulate solids. The following formula can be used to calculate Encapsulation Efficiency:

$$\text{Encapsulation Efficiency} = \frac{\text{Polymer Observed as Coating}}{\text{Theoretical Polymer for Coating}}$$

Hence, polymer that nucleates to form polymer-only particles reduces the Encapsulation Efficiency. In the preferred aspects of this invention, Encapsulation Efficiencies of at least 85 percent, preferably, at least 90 percent, are achieved.

In general, it is preferred to use the amphiphilic polymer in amounts which in the system are below those which form an undue amount of stable micelles. Stable micelles provide sites at which monomer can polymerize and thus reduce the Encapsulation Efficiency. The concentration of amphiphilic polymer at which stable micelles are formed will depend upon the system, and concentrations greater than the critical micelle concentration may be used without the undue formation of stable micelles. Many amphiphilic polymers do not readily form stable micelles even though they may be present in amounts greater than the critical micelle concentration. The critical micelle concentrations are usually determined under conditions which favor the formation of micelles. These conditions are not generally present in coating and polymerization systems which involve agitation and short residence times. Surfactants such as cationic and anionic surfactants tend to more readily form stable micelles than do nonionic surfactants, and with respect to nonionic surfactants, the longer the hydrophilic chain the more difficult to form micelles and the less pronounced is the critical micelle concentration. Moreover, the presence of other components in the system, e.g., the substrate surface to be coated or encapsulated and surfactant, if any, can affect the concentration of amphiphilic polymer needed to form micelles and the rate of formation and stability of the micelles. For instance, any amphiphilic polymer adsorbed on the substrate surface would not be available for undesirable micelle formation. Usually, the concentration of amphiphilic polymer approximates the theoretical critical micelle concentration, i.e., is at least about 70 mole percent, say, 75 to 110 or 200, mole percent of the critical micelle concentration as determined in distilled water. In any event, at least sufficient amphiphilic polymer is used, in combination with any surfactant present, to provide on a theoretical basis a bilayer defining a hydrophobic zone, over at least a portion, e.g., at least 25, preferably at least 50, percent of the surface area to be coated. The amount of amphiphilic polymer used for the best coating results will, nevertheless, be dependent upon other components in the coating system including the presence of any surfactant, as mentioned above, as well as the nature of the surface to be coated. When particles are to be encapsulated and dispersed in an aqueous medium, the relative amount of amphiphilic polymer should be sufficient to provide enhanced stability to the dispersion yet maintain the aqueous medium at a viscosity within suitable ranges. If too much amphiphilic polymer is used, the viscosity of the dispersion may be undesirably high. Often, the amphiphilic polymer is provided in an amount of at least about 0.01 weight percent based on the weight of particulate solids, e.g., from about 0.01 to 5, say, about 0.5 to 2, weight percent based on the weight of particulate solids. The concentration of the amphiphilic polymer provided to the aqueous medium is sometimes between about 0.1 to 50 grams per liter, say, about 0.5 to 20 grams per liter.

The amphiphilic polymers useful in the present invention are characterized as having a hydrocarbyl-containing hydrophilic backbone having a hydrophilic moiety on average less than about 2.5, often between about 1 and 2.5, carbon atoms apart, preferably having a hydrophilicity equivalent to at least about —(CH$_2$CH$_2$O)—$_{70}$H, and at least one lipophilic segment pendant from the backbone such that the amphiphilic polymer exhibits an LHB value of at least about 1.5, preferably at least about 2. Often, the LHB value is about 1.5 to 15, for instance, about 2 to 12.

The LHB value for an amphiphilic polymer is determined by dividing the weight average molecular weight of the lipophilic segment(s) on the backbone by the weight average molecular weight of the amphiphilic polymer times 20. For instance, a nonylphenol ethoxylate having about 70 —(CH$_2$CH$_2$O)— units would have an LHB value of about 1.2. If two nonylphenol groups were present, the ethoxylate would have an LHB value of about 2.2.

Hydrophilic moieties include ether oxygen atoms, double-bonded oxygen, hydroxyl groups, carboxylate groups, thio groups, amido groups, amino groups, imido groups, sulfonyl groups, phosphonyl groups, carbamate groups, carbonate groups, phosphate groups, sulfate groups and the like. Hence, these groups can be integral within the backbone such as in a poly(oxyethylene) chain or an ether in a cellulosic structure, or they can be pendant from the hydrocarbyl-containing backbone such as hydroxyl groups and carboxylate groups. The molecular weight of the hydrophilic backbone is preferably at least about 2500, say, at least about 3000 to 2 million or more. The backbone preferably contains in direct chain relationship (as opposed to being in pendant groups) at least about 100 carbon atoms, e.g., at least about 140, say, 150 to 150,000 carbon atoms (on a weight average basis). In general, with the longer backbones for a given type of amphiphilic polymer, the more strongly the coating is bonded to the surface. The amphiphilic polymer can be selected on the basis of its interaction with the surface to be coated. Some amphiphilic polymers seem better suited for certain surfaces while other amphiphilic polymers may be less desirable, but yet, for other surfaces, the rankings of the amphiphilic polymers may be changed. Often, with less hydrophilic surfaces, amphiphilic polymers having longer backbones and stronger polar (hydrophilic) moieties are preferred.

The hydrophilic backbone of the amphiphilic polymer may contain lipophilic groups or segments. The lipophilic segments are termed as being "pendant" but may include terminal groups as well. The lipophilic moieties may comprise aliphatic and/or aromatic hydrocarbyl groups, e.g., alkyl, alkenyl, aryl, alkynyl, aralkyl, alkaryl groups which may each have from 1 to about 40 carbons, preferably, from about 6 to 35 carbons. Preferably, the hydrocarbyl groups are of a sufficiently low molecular weight and/or low linearity that the amphiphilic polymer is essentially non-crystalline (amorphous). Advantageously, the Krafft point of the amphiphilic polymer as determined at a 20 weight percent solution in distilled water is below about 70° C., preferably below about 50° C. and even more preferably below about 25° C. Hence, cyclic (especially aromatic) and branched hydrocarbyl lipophilic segments are preferred over linear hydrocarbyl segments. Most frequently, more than one lipophilic segment will be pendant from the hydrophilic backbone.

One preferred type of amphiphilic polymer contains at least about 50, preferably at least about 70, say about 70 to 10,000 or 20,000, —(CH$_2$CH$_2$O)— units ("EO Units"). Advantageously, at least about 50, preferably at least about 70, EO units are provided which are unbroken by a lipophilic group within the backbone, although a lipophilic group may depend from the backbone (however, one or more hydrophilic groups may break the EO chain). While not wishing to be restricted to theory, it is believed that the long, uninterrupted hydrophilic chain enhances the attraction between the amphiphilic polymer and the substrate surface. It is even conceivable that the EO chain may loop away from the substrate surface to provide pockets of hydrophilicity within the hydrophobic zone defined by the lipophilic segments. With sufficiently long EO chains, the hydrophilic backbone may attach at several points to the substrate surface.

One type of amphiphilic polymer is known as polymeric associative thickeners. Polymeric associative thickeners useful in the present invention generally have a molecular weight (weight average) of 10,000 to 2 million, preferably 75,000 to 750,000. In addition, the polymer comprises, in a single molecule, a polymeric backbone containing more than one hydrophobic segment and at least one hydrophilic segment. In one embodiment, the hydrophobic segment contains in the average molecule more than one pendant hydrophobic group, e.g., a nonylphenoxymethyl group, bonded to the polymeric backbone. The hydrophilic segment contains a plurality of hydrophilic groups, e.g., polyoxyethylene groups, comprising at least a portion of the backbone. Suitable polymeric associative thickeners are set forth in the Examples and additional polymeric associative thickeners are described in U.S. Pat. Nos. 4,426,485; 4,496,708; 3,779,970; 4,304,902; 4,228,227; 4,209,605, European Patent Publication No. 0013836, and European Patent Publication No. 0011806, the disclosures of all of which are incorporated herein by reference.

The polymeric associative thickeners having two or more hydrophobic segments are termed as comprising "bunched hydrophobic groups" when the hydrophobic segments are in close association, or proximity, with each other, e.g., within about 50, most preferably within about 25, covalently bonded, sequentially connected atoms. Polymeric associative thickeners having bunched hydrophobes are disclosed in U.S. Pat. No. 4,426,485.

A class of polymeric associative thickeners useful in the present invention have the formula

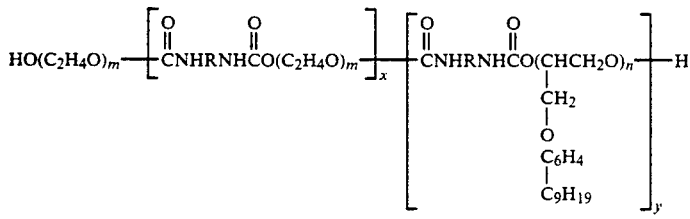

wherein R is a divalent organic group such as alkylene, arylene, alkenylene, alkarylene, aralkylene, cycloalkylene and cycloalkenylene, m is a number having an average value of about 90 to about 320, preferably about 180 to about 230, n is a number having an average value at least about 1 and preferably 1 up to about 30, x is a number having an average value of greater than about 1, preferably about 5 to about 25, and y is a number having an average value of greater than about 1 and preferably from more than about 1 to about 10. Associative thickeners of this type are conveniently used as a solution in butyl carbitol, e.g., about 16 wt. % with water preferably being about 64 wt. %. Polymeric associative thickeners of this type are disclosed in U.S. Pat. No. 4,426,485.

Associative thickeners also include hydrophobized polysaccharides, e.g., hydrophobized starches, celluloses and gums such as xantham gums and gum arabic. Hydrophobizing groups represent the pendant lipophilic moieties as discussed above.

Frequently, the amphiphilic polymer is relatively free from ionic groups, e.g., often less than 2 or 3 ionic groups are provided on average per molecule, and in most instances the amphiphilic polymer is nonionic. When ionic moieties are present, they should be in an amount which, at the concentrations of amphiphilic polymer desired to provide, e.g., enhanced bonding and particle dispersion, does not result in an undue reduction in Encapsulation Efficiency. The amphiphilic polymer may contain reactive groups such as those that may copolymerize with the hydrophobic polymer.

d. Nonionic Surfactant

In many instances, enhanced Encapsulation Efficiency is obtained when nonionic surfactant is included in the aqueous polymerization medium. The desirability for nonionic surfactant appears to be related to the number and location of the lipophilic segments in the amphiphilic polymer. In general, the more widely dispersed the lipophilic segments in the amphiphilic polymer, the more desirable is to use a nonionic surfactant. The desirability of using a nonionic surfactant will also be related to the polymerization system employed. With many amphiphilic polymers in a vinyl latex polymerization system, nonionic solvent may not be essential; however, with acrylic polymerization systems, the nonionic surfactant can be quite beneficial. The nonionic surfactant has a hydrophilic component less hydrophilic than the hydrophilic backbone of the amphiphilic polymer. The HLB value of the nonionic surfactant may vary widely, e.g., from about 5 to 19.5 or more, e.g., about 10 to 19. It should be noted that when combinations of amphiphilic polymers are used with one of the amphiphilic polymers having a hydrophilic backbone, e.g., an EO chain, not interrupted nor having both ends terminated with hydrophobic group, desirable Encapsulation Efficiencies may be obtained in some systems even in the absence of nonionic or other surfactants.

While not wishing to be limited to theory, it is believed that the hydrophobe of the nonionic surfactant is attracted to the lipophilic segments of the amphiphilic polymer and assist in defining a hydrophobic zone in which the hydrophobic polymer coating is formed. The amphiphilic polymer is believed to be more strongly attracted to the substrate surface than the nonionic surfactant. This phenomenon, together with the attraction of the surfactant to the surface, may permit the use of greater amounts of nonionic surfactant than would be expected to result in undue micelle formation.

The amount of nonionic surfactant, when used, is preferably present in an amount sufficient to enhance the Encapsulation Efficiency. While the nonionic surfactant can contribute to obtaining a stable dispersion of coated particles, often the primary factor in the stabilization is the amphiphilic polymer. If desired, the nonionic surfactant can be used in an amount sufficient to provide a reasonably stable aqueous dispersion of the hydrophobic polymer-coated particulate solids. When used, the nonionic surfactant is typically present in an amount of about 1 weight percent to about 30 weight percent, preferably about 5 weight percent to about 20 weight percent, based on the weight of the particulate solids. If unduly large amounts of nonionic surfactant are used, risks exist that micelles will form in the aqueous phase and provide nucleation sites for the generation of polymer particles and thus reduce Encapsulation Efficiency. In many instances, due to the systems used, the concentration of nonionic surfactant, when used, is greater than the critical micelle concentration as determined in distilled water for the surfactant. Indeed, amounts of nonionic surfactant ten times greater than that required to achieve a critical micelle concentration in distilled water have been used without undue micelle formation and with high Encapsulation Efficiencies. Frequently, the nonionic surfactant is provided in a weight ratio of surfactant to amphiphilic polymer of 0 to about 100:1, say, about 1:1 to 50.1, more preferably, about 10:1 to 40:1.

Nonionic surfactants suitable for use in this invention contain a hydrophilic group such as a polyoxyethylene chains and a hydrophobic group such as the nonylphenyl group. Also included as suitable nonionic surfactants are the polycondensates of propylene oxide and ethylene oxide with various hydrophobic groups. Examples are octyl or nonyl phenol polyethoxylates containing 10 to 150 EO groups, polyethoxylated esters of fatty acids, polyethoxylated esters of fatty alcohols, ethylene oxide/propylene oxide block copolymers, fatty amine ethoxylates, alkyl-phenol formaldehyde novolac resin alkoxylates and the like, and the nonionic surfactants such as described in U.S. Pat. No. 4,608,401, columns 11–13; and U.S. Pat. No. 4,209,333, both incorporated herein by reference.

e. The Hydrophobic Polymer

The hydrophobic polymer provides the coating on the solid surface and is produced by polymerization of polymerizable components while the surface is in an aqueous medium. The polymerizable components may be prepolymers or monomers. For the sake of convenience, both prepolymers and monomers will be referred to herein as "monomers" since they take part in further polymerization or cross-linking. The amount of monomer used is not narrowly critical and can range for coating solid particles from about 1 wt. part monomer per about 9 wt. parts of particulate solids to about 9 wt. parts monomer per about 1 wt. part of particulate solids. The amount used will depend upon the thickness of the desired coating, the Encapsulation Efficiency, and the percentage of the monomer polymerized. Since the monomer may be added initially or both initially and during the polymerization, the concentration of monomer with respect to the aqueous medium can vary widely, e.g., about 0.1 weight percent to 100 or more weight percent based on the amount of aqueous solution present.

The monomers employed in the present invention to produce the hydrophobic polymer coating on the substrate surface include essentially water immiscible monomers as well as those that are miscible in water. The selection of the monomer and polymerization system is made in concert with the other components of the system. Conditions such as pH and temperature for a given polymerization system need to be taken into account when selecting the amphiphilic polymer and nonionic surfactant, if any. For instance, temperature and pH can affect surfactant performance, hydrophilicity of the amphiphilic polymer and critical micelle concentrations.

Examples of monomers include monovinylidene aromatic monomers such as styrene, vinyl toluene, t-butyl styrene, chlorostyrene, vinylbenzyl chloride and vinyl pyridine; alkyl esters of alpha, beta-ethylenically unsaturated acids such as ethyl acrylate, methyl methacrylate, t-butyl acrylate, n-butyl acrylate and 2-ethylhexyl acrylate; unsaturated esters of saturated carboxylic acids such as vinyl acetate; unsaturated halides such as vinyl chloride and vinylidene chloride; unsaturated nitriles such as acrylonitrile; dienes such as butadiene and isoprene; and the like. Of these monomers, the unsaturated esters such as vinyl acetate, the alkyl acrylates and methacrylates, such as butyl acrylate and methyl methacrylate, are preferred. In addition to the aforementioned hydrophobic monomer, relatively minor portions, e.g., less than 10, preferably less than 5 weight percent based on total monomer component, of water-soluble monomer such as an ethylenically unsaturated carboxylic acid or its salt such as acrylic acid or sodium acrylate; methacrylic acid; itaconic acid and maleic acid; an ethylenically unsaturated carboxamide such as acrylamide; vinyl pyrrolidone; hydroxyalkyl acrylates and methacrylates such as hydroxyethyl acrylate, hydroxypropyl acrylate and hydroxyethyl methacrylate aminoalkyl esters of unsaturated acids such as 2-aminoethyl methacrylate; epoxy functional monomers such as glycidyl methacrylate; sulfoalkyl esters of unsaturated acids such as 2-sulfoethyl methacrylate; ethylenically unsaturated quaternary ammonium compounds such as vinylbenzyl trimethyl ammonium chloride may be employed. However, the water-soluble monomers may not be employed in amounts sufficient to render the resulting polymer soluble in water. Particularly effective monomer recipes for the practice of this invention are those containing from about 20 to about 90 weight percent of vinyl acetate and from about 10 to about 80 weight percent of alkyl acrylate such as n-butyl acrylate or t-butyl acrylate with said weight percentages being based on the weight of total monomers.

The polymer coating may comprise the same polymer throughout its thickness or the polymer may vary. For instance, monomers to provide a hydrophobic polymer which readily coats the substrate surface may first be used with a different monomer or comonomer blend being used for at least a portion of the remainder of the coating thickness. This portion of the coating may have different properties than that initially applied. For example, this portion of the coating may be tougher and/or more rigid and may less readily coat the substrate surface than the first portion of the coating. Also, in this manner a portion of the coating can be swellable or otherwise be treated so that the coating can be deformed. When the swelling is reduced, pockets may be formed within the coating. These pockets may be helpful in, say, increasing the hiding power of a paint.

f. The Process

The substrate surface can be contacted with the aqueous medium in any suitable manner. The aqueous medium preferably contains at least about 50, more preferably, at least about 90, volume percent water. Other solvent or liquid can be present, e.g., ethylene glycol, ethanol, propanol and propylene glycol, as well as other typical additives for emulsion polymerization such as defoamers, plasticizers, etc. Most frequently, when such other components are present, the aqueous medium is in a single liquid phase and the other components do not dissolve or swell the hydrophobic polymer.

To facilitate avoiding agglomerizations when processing particulate solids, dispersions can be provided by means producing high shear mixing. Examples include Cowles dispersing equipment, a Waring blender, a homogenizer, or an ultrasonic mixer. The proportion of aqueous medium and particulate solids used to make the initial dispersion is not critical. Frequently, this proportion ranges from about 50 to about 80 weight percent of the particulate solids based on the combined weight of the aqueous medium and particulate solids. This is within the range for usual grinding procedures for producing, for instance, a pigment paste which can then be let down, i.e., diluted with additional aqueous solution, e.g., to about 30 to about 75% of the particulate solids based on the combined weight of aqueous medium and particulate solids. The conditions of grinding or dispersing the particles in the water are not narrowly critical and can be varied over a wide range. Normally, the mixture is neither heated nor cooled other than by interaction with the ambient environment and the temperature is determined by the heat produced during grinding, e.g., temperatures are often between about 30° and 50° C. although higher or lower temperatures can be used. Other grinding aids can also be employed such as propylene glycol in amounts of up to about 50% by weight of the highly divided solid particles.

In practicing this invention, sometimes a water soluble anionic dispersant is used. While anionic dispersants most commonly find use in providing dispersions of particulate solids for encapsulation, they are seldom preferred due to the tendency to form micelles or otherwise reduce Encapsulation Efficiencies. If an anionic dispersant is used, it often is present in an amount of about 0.001 to about 5, e.g., about 0.01 to about 1, weight percent based on the aqueous solution. For particulate solids, the amount of anionic dispersant is sometimes in an amount of about 0.1 to about 10, preferably about 0.5 to about 2%, by weight of the particulate solids.

Anionic dispersants include salts of fatty acids such as potassium oleate, metal alkyl sulfates, such as sodium lauryl sulfate, salts of alkylaryl sulfonic acids such as sodium dodecylbenzene sulfonate, polysoaps such as sodium polyacrylate copolymers of alkali metal poly(meth)acrylates with various comonomers, and alkali metal salts of methyl methacrylate/2-sulfoethyl methacrylate copolymers and other sulfoalkyl acrylate copolymers, and other anionic surfactants such as the dihexyl ester of sodium sulfosuccinic acid; alkyl-sulfoxide and alkyl-sulfone terminated oligomers as described in U.S. Pat. Nos. 3,776,874 and 3,668,230; alkyl-sulfoxide terminated oligomers as described in U.S. Pat. No. 3,772,382; alkyl-sulfide terminated oligomers as described in U.S. Pat. Nos. 3,632,466; 3,498,942; 3,498,943 and 3,839,405. The potassium or ammonium salts of functionalized oligomers, e.g., Polywet (TM) varieties sold by Uniroyal Chemical, can be used as the anionic dispersant. When using anionic surfactants, ammonium salts are usually preferred to minimize the tendency toward micelle formation and thus maintain acceptable Encapsulation Efficiencies. Such surface active agents or emulsifiers are employed in amounts sufficient to enhance the ability to achieve a stable dispersion of the particulate solids in the aqueous medium. Anionic surfactants or dispersants can generally be used after encapsulation or coating without adverse effect on the Encapsulation Efficiency. This may be useful with encapsulated particles which are desired to be provided in stable dispersion.

The amphiphilic polymer may be added to the aqueous medium in any convenient manner and, preferably, at a time prior to the initiation of the polymerization. Frequently, when coating particulate solids, the amphiphilic polymer is added after the particulate solids are provided in the aqueous medium. The formation of the hydrophobic polymer coating may occur during or after the dispersion of the particulate solids in the aqueous medium. Separate vessels may be employed for the dispersing and the polymerization, or the entire process may occur in one vessel.

Contacting the particulate solids in the aqueous medium with the amphiphilic polymer and the polymerization step can be carried out sequentially. High shear mixing can be carried out during the polymerizing step or no, low or non-shear mixing can be used during the polymerizing step. Optionally, both the contacting with amphiphilic polymer and polymerizing can be carried out concurrently in the same reaction vessel or the contacting with amphiphilic polymer can be carried out in one vessel and the polymerizing step can be carried out in another. The concurrent carrying out of contacting with amphiphilic polymer and polymerization are preferred from more than one standpoint. Initially, there is some time, labor and machinery costs saved since obviously no transfer of the dispersed material is required and only one reaction vessel is needed instead of a contacting vessel and a separate reaction vessel.

With smaller particle sizes and for applications such as pigments in paint, the dispersion of the particulate solids is preferably reasonably stable, i.e., the dispersion does not immediately settle upon ceasing the mixing. Often, for these applications, appreciable settling of the particulate solids does not occur for a period of at least about 1, say, at least about 6, hours, and preferably, the dispersion is stable for about 10 to 1000 or more hours.

The polymerization conditions employed in the practice of this invention can vary widely depending upon the monomer and catalysts, if any, used. Conveniently, free radical-type or redox-type polymerization systems are used. In general, free radical-type polymerization is carried out in the presence of a free radical initiator such as peroxygen compound, an azo catalyst, ultraviolet light or any other free radical initiator. Examples of suitable peroxygen compounds which can be employed as catalyst include inorganic persulfate compounds such as sodium persulfate, potassium persulfate and ammonium persulfate; peroxides such as hydrogen peroxide, t-butylhydroperoxide, dibenzoyl peroxide and dilauroyl peroxide; azo catalysts such as azobisisobutyronitrile, and other common free radical generating compounds. Also suitable are various forms of free radical generating radiation means such as ultraviolet radiation, electron beam radiation and gamma radiation. Preferably, free radical-type polymerization is carried out in the presence of a water-soluble peroxygen compound at temperatures in the range from about 40° to about 100° C.

Alternatively, a redox catalyst composition can be employed wherein the polymerization temperature usually ranges from 25° to about 80° C. Exemplary redox catalyst compositions include a peroxygen compound as described hereinbefore, preferably potassium persulfate or t-butyl hydroperoxide and a reducing component such as sodium metabisulfite or sodium formaldehyde sulfoxylate. It is also suitable to employ various chain transfer agents such as mercaptans, e.g., dodecyl mercaptan; dialkyl xanthogen disulfides; diaryl disulfides and others listed by Blackley in *Emulsion Polymerization*, Chapter 8 in concentrations as described therein.

The catalyst concentration will be a factor in influencing the average molecular weight and molecular weight distribution of the hydrophobic polymer coating. With too much catalyst, the average molecular weight is low which leads to a weaker and less scrub resistant coating.

The catalyst concentration for both free radical-type and redox-type polymerization is normally in the range from about 0.005 to about 8, preferably from about 0.01 to about 5, and many times from about 0.1 to 0.5, weight percent based on the weight of total monomer.

High shear mixing during the polymerization may not only help in preventing agglomerization and/or settling of the particulate solids but also, it may help improve transfer of monomer to the hydrophobic zone at the surface of the particulate solid. This can enhance Encapsulation Efficiency. Unlike conventional encapsulation or coating processes such as disclosed by Solc in U.S. Pat. No. 4,421,660, in the processes of this invention the monomer is preferably not emulsified and dispersed using a dispersing agent in the aqueous medium. Without wishing to be limited to theory, it is believed that monomer-rich phases exist in the aqueous medium and that the monomer, with some degree of solubility in the aqueous phase (which may be very limited), is in equilibrium between the monomer phase and the aqueous phase. A similar equilibrium exists between the aqueous phase and the hydrophobic zone at the surface of the particulate solids where the hydrophobic polymer is sought. Thus, the high shear mixing can enhance transfer of monomer to the surface of the particulate solid and may tend to reduce the presence of conditions that enable the nucleation of polymer particles in the aqueous phase. Surfactant present in the aqueous medium may also assist in the transfer of monomer.

Figure 2:
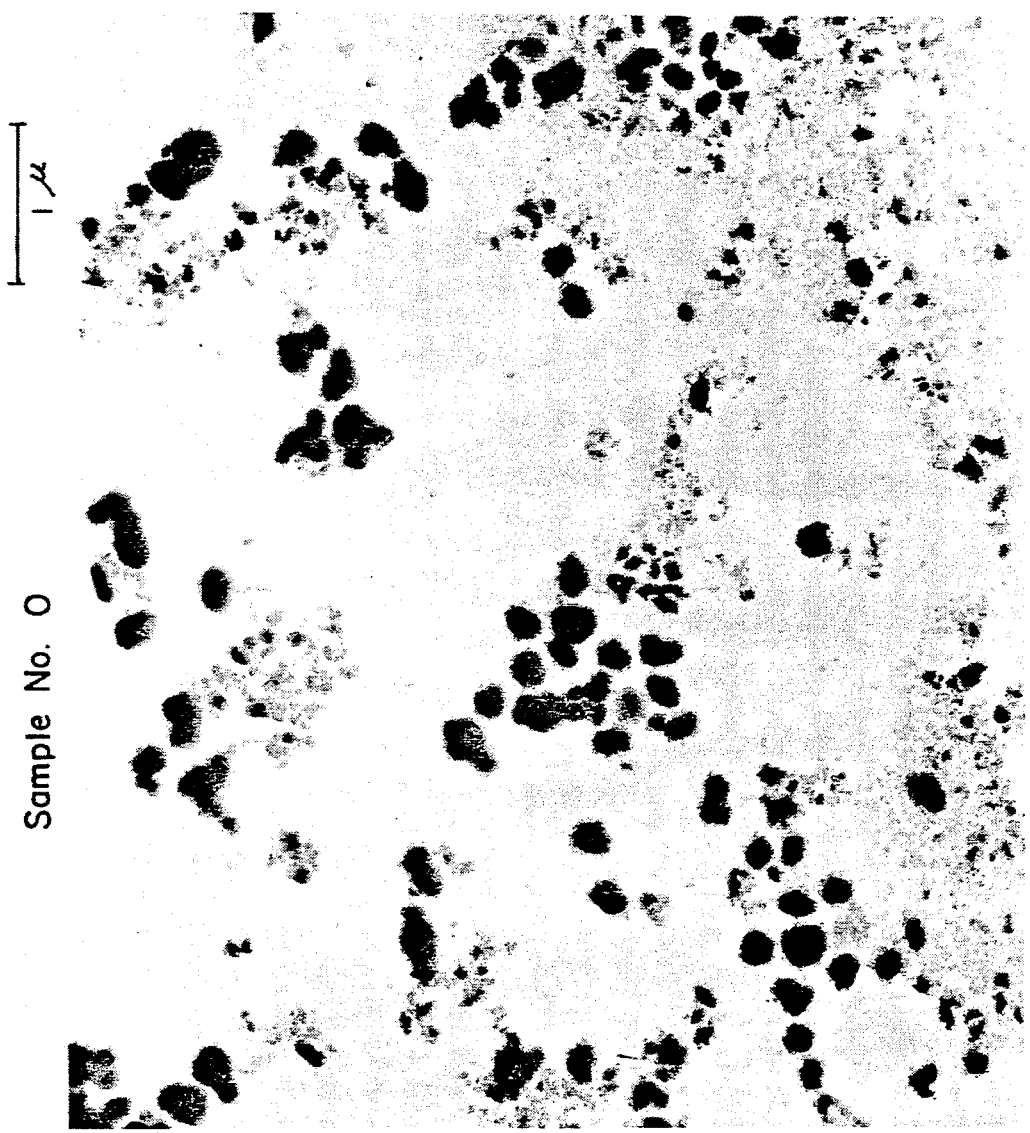
FIG. 2 is a transmission electron photomicrograph of Sample No. 0 as contained in the file in the United States Patent and Trademark Office of U.S. Pat. No. 4,421,660 to Solc.

The thickness of the coating may be selected over a wide range, e.g., from about 0.01 to 10, often, about 0.03 to 0.5 or 1 micron. Generally, the coatings are relatively uniform at the surface of the particulate solids. FIG. 2 shows the uniformity of a coating prepared by a process of this invention. In addition, the hiding power for the concurrent grinding-polymerizing procedure results in extremely high hiding powers for titanium dioxide in conventional paint formulations, i.e., as high as 180 or more square feet per pound of titanium dioxide.

In advantageous aspects of this invention, the particulate solid is finely divided, e.g., less than 2 microns in average particle size and is desired to be in a relatively stable dispersion in a liquid medium after coating with the hydrophobic polymer. The amphiphilic polymer alone or in combination with nonionic surfactant used to define the hydrophobic zone can assist in providing the relatively stable dispersion and can tend to minimize the formation of agglomerates of the coated particulate solids, and those agglomerates which form may be more readily broken apart.

The coated surface can be removed from the aqueous medium or, especially in the case of pigments for latex paints, remain dispersed in the aqueous medium. The encapsulated particulate solids of this invention can have advantageous Properties for recovery of the particulate solids in dry form without undue agglomeration. The particulate solids are capable of being redispersed in aqueous or other liquid medium without undue grinding. Moreover, the coated particulate solids may find use in molding compositions and the like. The other surfaces coated can find application where such materials are suitable for use, e.g., structural members, fillers, etc.

EXAMPLES

The following examples are presented wherein all parts and percentages are on a weight basis, all temperatures are on the Centigrade scale, and the following designations are defined as follows.

A.T. I: a solution of 20 wt. % of a polymeric associative thickener having the formula:

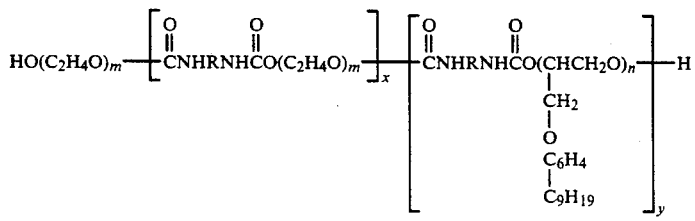

wherein R is a divalent organic group having the formula

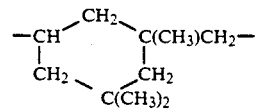

m has an average value of 180 to 230, n has an average value of greater than about 1 up to about 30, e.g., 1.5, x is an integer of about 5 to about 25, and y has an average value of greater than 1 to 10 and a weight average molecular weight of about 150,000 to 200,000 16 wt. % butyl carbitol and 64 wt. % water. A.T. I is a polymer of the type described in U.S. Pat. No. 4,426,485.

A.D. I: a solution of 35 wt. % of an anionic dispersant believed to have the formula:

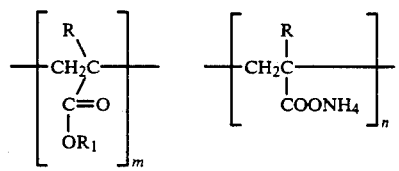

wherein $R_1$ is believed to be a lower alkyl or derivative thereof, m and n are integers and R is hydrogen or lower alkyl; and having a molecular weight of up to about 10,000. An aqueous solution of this anionic dispersant containing 65 wt. % water is marketed as Tamol TM SG-1 by Rohm and Haas Company, Philadelphia, Pa.

Defoaming Solution I: is believed to be a solution of 35 wt. % of a defoamer and 65 wt. % mineral oil marketed as DeeFo (TM) 495 by Ultra Adhesives Inc., of Paterson, N.J.

Igepal  C0997: a solution of 70 wt. % of a non-ionic surfactant having the formula:

$$C_9H_{19}C_6H_4O(C_2H_4O)_nH$$

wherein n is an average of 100 and 30 wt. % water available from GAF Corp., New York, N.Y. (While "n" is reported has the manufacturer to one about 100, our analytical work indicates that "n" may be closer to 70.)

Tergitol 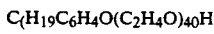 NP-40: a solution of 70 wt. % of a non-ionic surfactant having the formula:

$$C_9H_{19}C_6H_4O(C_2H_4O)_{40}H$$

and 30 wt. % water available from Union Carbide Corporation, Danbury, Conn.

The following properties were observed for products of the Examples were obtained from the tests described below.

| | |
| --- | --- |
| Hiding Power | ASTM D 2805-70 |
| Gloss | ASTM D 523-78 |
| Scrub Test | ASTM D-2486 |
| Settling | Allowed to stand for about one week or other time periods as noted, after which time, the amount of settling was observed |

F. B. Steig, "Pigment/Binder Geometry", in *Pigment Handbook*, Vol. III (T. Patton, Ed.), Wiley-Interscience (1973) pp 203-217, noted a relationship between hiding power for titanium dioxide paints and pigment volume concentration (PVC). This relationship for conventional paints can be expressed as

*Expected Hiding Power (square feet per pound)* $= 409[0.9045 - (PVC)^{\frac{1}{3}}]$.

Hence, since pigment volume concentrations vary, the most meaningful comparisons should be related to the percent improvement over the theoretical Steig prediction:

% Hiding Power over Steig $= 1 - \dfrac{\text{Observed hiding power}}{\text{Expected Hiding Power}}$.

EXAMPLE 1

A. A pigment grind was prepared by premixing the following ingredients in a Cowles mixer.

TABLE I

| Ingredient | Parts by Weight |
| --- | --- |
| Water | 250 |
| Propylene glycol | 250 |
| A.T. I | 58 |
| A.D. I | 91 |
| Defoaming Solution I | 20 |
| Titanium dioxide (TiPure R-100) | 2000 |

All of the above ingredients except the pigment were mixed for 30 minutes and then the TiO$_2$ was added gradually while increasing the grinding speed from 1900 rpm to 4900 rpm gradually. Grinding at 4900 rpm was continued for about 30 minutes until a film cast on a Hegman gauge gave a reading of about #7 with no grits. The resulting grind was let down with a mixture of:

TABLE II

| Ingredient | Parts by Weight |
| --- | --- |
| A.T. I | 58 |
| Water | 233 |
| Propylene glycol | 233 |

The resulting pigment slurry had a solids content of about 65%.

The following ingredients were mixed in a reactor:

TABLE III

| Ingredient | Parts by Weight |
| --- | --- |
| Water | 328 |
| Igepal C0997 (70% aqueous soln.) | 18 |
| Tergitol NP-40 (70% aqueous soln.) | 18 |

The above-mentioned pigment slurry was added in a thin stream in an amount to provide 300 g of TiO$_2$ while stirring and avoiding splashing the pigment up on the walls of the reactor. Thereafter, 45 wt. parts of vinyl acetate were added and the reactor contents were heated while stirring and purging with nitrogen. When the temperature of the reactor contents reached 52° C., 20 wt. parts of t-butyl hydroperoxide (3 wt. % aqueous solution) were added. When the reaction temperature passed 56° C., 20 wt. parts of sodium formaldehyde sulfoxylate (3 wt. % aqueous solution) were added. When the reaction temperature passed 62° C., a monomer mixture of 210 wt. parts vinyl acetate and 45 wt. parts of t-butyl acrylate were fed in over a period of 70 minutes at a rate of 3.64 wt. parts/min. and a catalyst solution of 50 wt. parts of t-butyl hydroperoxide (3 wt. % aqueous solution) and 50 wt. parts of sodium formaldehyde sulfoxylate (3 wt. % aqueous solution) were fed in over a period of 100 minutes at the rate of 0.5 wt. part/minute. The reaction temperature was maintained at 65° C. while monomer and catalyst were being fed. The temperature was raised to 70° C. at the completion of the monomer feed and the reaction mixture was maintained at 70° C. for 60 minutes (including the final 30 minutes of feeding the two catalysts). Stirring and a nitrogen blanket were maintained throughout the reaction.

B. The procedure of Example 1A. was repeated, the only exception being that n-butyl acrylate was substituted, weight for weight, for t-butyl acrylate to provide a water-based paint which had no tendency to settle. The resulting water-based paint also had a better gloss, better viscosity stability, equivalent hiding power and less scrub resistance compared to a similar water-based paint made without A.T. I.

EXAMPLES 2-10

Additional latexes were prepared according to the procedure described in Example 1. The amounts of A.T. I, A.D. I and Igepal CO 997 based on the combined weights of TiO$_2$ and monomer were varied to observe the contribution of each component and interactions between the components. The amounts given in Table IV below are weight parts of active ingredient (not solution) per one hundred weight parts of pigment and monomer.

TABLE IV

| | Example | | | | | | | | |
| --- | --- | --- | --- | --- | --- | --- | --- | --- | --- |
| | 2 | 3 | 4 | 5 | 6 | 7 | 8 | 9 | 10 |
| A. T. I | 0.2 | 1.0 | 0.2 | 1.0 | 0.2 | 1.0 | 0.2 | 1.0 | 0.6 |

TABLE IV-continued

| | Example | | | | | | | | |
|---|---|---|---|---|---|---|---|---|---|
| | 2 | 3 | 4 | 5 | 6 | 7 | 8 | 9 | 10 |
| A. D I | 0.2 | 0.2 | 1.0 | 1.0 | 0.2 | 0.2 | 1.0 | 1.0 | 0.6 |
| CO 997 | 3.0 | 3.0 | 3.0 | 3.0 | 7.0 | 7.0 | 7.0 | 7.0 | 5.0 |

Each resulting product dispersion was tested for hiding power, gloss and settling (short term) and the following results were obtained.

TABLE V

| | Properties | | | | | | | | |
|---|---|---|---|---|---|---|---|---|---|
| | Example | | | | | | | | |
| | 2 | 3 | 4 | 5 | 6 | 7 | 8 | 9 | 10 |
| Hiding power, ft²/#[a] | 138 | 157 | 161 | 166 | 162 | 176 | 162 | 180 | 164 |
| Hiding power, ft²/#[b] | 137 | 158 | 164 | 166 | 167 | 180 | 156 | 180 | 168 |
| % Hiding power over Steig Calculation | 14 | 24 | 29 | 33 | 26 | 35 | 24 | 37 | 30 |
| Gloss, 60° | 78 | 81 | 76 | 85 | 72 | 74 | 78 | 73 | 71 |
| Gloss, 20° | 29 | 41 | 35 | 48 | 26 | 30 | 38 | 31 | 27 |
| Settling | Yes | No | No | No | No | No | No | No | No |

[a]Based on the theoretical pigment volume concentration.
[b]Based on an anaylsis of the actual pigment volume concentration.

The hiding power values for Examples 3 to 10 exceed the reported value for rutile-grade $TiO_2$ of 147 square feet per pound (CEH Marketing Research Report, Titanium Dioxide Pigments, *Chemical Economics Handbook.* SRT International, 1986). Likewise, the product dispersions of Examples 3 through 10 were resistant to settling under ambient conditions. The 60° Gloss values for each of Examples 2 through 10 are considered to be very high for latex paints, when compared to the Gloss values obtained by the process described in U.S. Pat. No. 4.608,401.

The above data reveal that each component contributes to the hiding power when employed at suitably high concentrations.

EXAMPLES 11-19

In Example 11, a pigment grind was prepared by premixing the following ingredients in a Cowles mixer:

TABLE VI

| Ingredient | Parts by Weight |
|---|---|
| Water | 129.91 |
| Propylene glycol | 389.74 |
| A. T. I | 10 |
| A. D. I | 22.86 |
| Defoaming Solution I | 20 |
| Titanium Dioxide (TiPure R-900) (has a 4.5% max. alumina coating) | 2000 |

All of the above ingredients except the pigment were mixed for 30 minutes and then the $TiO_2$ was added gradually while increasing the grinding speed from 1900 rpm to 4900 rpm gradually. Grinding at 4900 rpm was continued for about 30 minutes until a film cast on a Hegman gauge gave a reading of about #7 with no grits. The resulting grind was let down with a mixture of:

TABLE VII

| Ingredient | Parts by Weight |
|---|---|
| A. T. I | 30 |

TABLE VII-continued

| Ingredient | Parts by Weight |
|---|---|
| Water | 519.65 |

The resulting pigment slurry had a solids content of about 65%.

The following ingredients were added in a resin vessel:

TABLE VIII

| Ingredient | Parts by Weight |
|---|---|
| Water | 164.7 |
| Igepal CO997 (70% aqueous soln.) | 18 |

The subsequent polymerization was conducted in a modified intermittent-type attritor, type B, manufactured by Union Process, Inc. of Akron, Ohio. This attritor was modified to equip it with a 700 cc reaction vessel, a four-necked glass reactor vessel cover, and a 2-inch Cowles dissolver disc. The disc was rotated at 1,000 rpm which provided vigorous dispersion and grinding of the pigment and reaction medium before and during the polymerization step. In Example 11, the above-mentioned pigment slurry was added in a thin stream in an amount to provide 198.9 wt. parts of $TiO_2$ while stirring and avoiding splashing the pigment up on the walls of the reactor. Thereafter, 30.1 wt. parts of vinyl acetate were added and the reactor contents were heated while stirring and purging with nitrogen. When the temperature of the reactor contents reached 52° C., 13 wt. parts of t-butyl hydroperoxide (3 wt. % aqueous solution) were added. When the reaction temperature passed 56° C., 13 wt. parts of sodium formaldehyde sulfoxylate (3 wt. % aqueous solution) were added. When the reaction temperature passed 62° C., a monomer mixture of 140.7 wt. parts vinyl acetate and 28.1 wt. parts of n-butyl acrylate were fed in over a period of 90 minutes at a rate of 2.05 wt. parts/min. and a catalyst solution of 34 wt. parts of t-butyl hydroperoxide (3 wt. % aqueous solution) and 34 wt. parts of sodium formaldehyde sulfoxylate (3 wt. % aqueous solution) was fed in over a period of 120 minutes at the rate of 0.28 wt. part/minute. The reaction temperature was maintained at 65° C., while monomer and catalyst were being fed and for 1 hour after termination of the monomer feed.

The procedure set forth in Example 11 was followed in Examples 12 through 19 except that the amounts of A. T. I, A. D. I and CO 997 in weight parts of the ingredient used per hundred wt. parts of the combined amounts of titanium dioxide and monomer are given in Table IX below.

TABLE IX

| | Example | | | | | | | | |
|---|---|---|---|---|---|---|---|---|---|
| | 11 | 12 | 13 | 14 | 15 | 16 | 17 | 18 | 19 |
| A. T. I | 0.2 | 1.0 | 0.2 | 1.0 | 0.2 | 1.0 | 0.2 | 1.0 | 0.6 |
| A. D. I | 0.2 | 0.2 | 1.0 | 1.0 | 0.2 | 0.2 | 1.0 | 1.0 | 0.6 |
| CO 997 | 3.15 | 3.0 | 3.0 | 3.0 | 7.0 | 7.0 | 7.0 | 7.0 | 5.0 |

The resulting product dispersions in Examples 11 through 19 were tested for hiding power, gloss and settling and the values given in Table X were obtained.

TABLE X

| | Properties | | | | | | | | |
|---|---|---|---|---|---|---|---|---|---|
| | Example | | | | | | | | |
| | 11 | 12 | 13 | 14 | 15 | 16 | 17 | 18 | 19 |
| Hiding power, ft$^2$/#$^a$ | 170 | 163 | 150 | 144 | 170 | 199 | 171 | 204 | 162 |
| Hiding power, ft$^2$/#$^b$ | 155 | 135 | 131 | 115 | 165 | 164 | 148 | 183 | 128 |
| % Hiding power over Steig Calculation | 40 | 36 | 23 | 23 | 32 | 54 | 34 | 57 | 34 |
| Gloss, 60° | 69 | 67 | 80 | 66 | 71 | 39 | 60 | 44 | 94 |
| Gloss, 20° | 26 | 17 | 36 | 15 | 26 | 8.5 | 17 | 9.5 | 16 |
| Settling | No | No | No | No | No | No | No | No | No |

$^a$Based on the theoretical pigment volume concentration.
$^b$Based on an anaylsis of the actual pigment volume concentration.

The superior hiding power observed in these Examples appears to result from the vigorous dispersion (grinding) in the presence of A. T. I, A. D. I and CO 997 during the polymerization step. These Examples establish the fact that all three components contribute to the superior hiding power when employed at suitable concentrations.

EXAMPLE 20

A pigment grind was prepared by premixing 1225 grams of water, 40 grams of DeeFo(TM) 495 (30% solution), 68.6 grams of Tamol(TM) SG-1 (35% solution of an ammonium polyacrylic salt available from Rohm and Haas Company), and 8 grams of A.T. I (20% solution) in a Cowles mixer for 30 minutes. Then 4000 grams of TiPure(TM) R-900 titanium dioxide (up to 4.5 weight percent alumina coating) were added gradually while increasing the grinding speed from 1900 rpm to 4900 rpm gradually. Grinding at 4900 rpm was continued for about 30 minutes. The resulting grind was diluted with 861 grams of water to produce a 64.86 weight percent solids pigment grind.

A vinyl acrylic encapsulated pigment was prepared by premixing 725 grams of water and 128.6 grams of Igepal TM CO-997 (70% solution) in a four-liter reactor. Then 1402.79 grams of the above pigment grind containing 900 grams of titanium dioxide were added, and the mixture was mixed thoroughly for 25 minutes at 23° C. The reactor was heated slowly in a water bath to 45° C. and 135 grams of vinyl acetate were added. When the reactor temperature reached 50° C., 30 grams of t-butyl hydroperoxide (3% aqueous solution) were added. At 55° C., 30 grams of sodium formaldehyde sulfoxylate (3% aqueous solution) were added, and the mixture was heated to 65° C. for an additional 39 minutes.

Then 657 grams of vinyl acetate and 108 grams of butyl acrylate were added as a mixture over a 90 minute period (a 9.16 cc/min feed rate). During the same period 90 grams of t-butyl hydroperoxide (1% aqueous solution) and 90 grams of sodium formaldehyde sulfoxylate (1% aqueous solution) were added over a 120 minute period or a feed rate of 0.75 cc/min. The product was heated an additional 30 minutes at 65° C., cooled to ambient temperature and stored in a glass container.

Three containers of the above vinyl acrylic encapsulated pigment were blended with one container of vinyl acrylic encapsulate pigment prepared in the same manner except that it contained 0.15% A.T. I. The composite contained 0.115 weight percent A.T. I.

The hydrophobic polymer coating had a number average molecular weight of 51,000 and the product had an Encapsulation Efficiency of 97.5%, good stability after standing under ambient conditions of 3 months and a hiding power of 152.4 square feet per pound of titanium dioxide or a 19% improvement over Steig predictions for conventional paints.

EXAMPLE 21

A pigment grind was prepared by premixing 120 grams of water, 30 grams of DeeFo(TM), 495 (30% solution), 102.9 grams of Tamol(TM) SG-1 (35% solution), and 7863.69 grams of DuPont TiPure(TM) R-940 slurry (76.3% aqueous solution of TiPure R-900 containing a dispersant, biocide and defoamer) in a Cowles mixer. Then a mixture of 90 grams of A.T. I (20% solution) and 500 grams of water was added gradually to the above mixture and stirred at a dispersing speed of 1500 rpm. Mixing at 1500 rpm was continued for about 30 minutes. The resulting mixture was diluted with 726.7 grams of water to produce a 64.27 weight percent solids pigment grind.

A vinyl acrylic encapsulated pigment was prepared by premixing 110 grams of water and 3 grams of maleic acid. Then 128.6 grams of Igepal(TM) CO-990 (35% solution of Igepal TM CO-997 in water and 667.15 grams of the pigment grind containing 424.34 grams of titanium dioxide were added with stirring to a two-liter reactor. After stirring the mixture for 45 minutes with a Lightnin TM mixer the reactor was heated slowly with a water bath to 63° C. Then 63.45 grams of vinyl acetate, 30 grams of t-butyl hydroperoxide (0.75% aqueous solution) and 30 grams of sodium formaldehyde sulfoxylate (0.75% aqueous solution) were added and the mixture was heated to 65° C. for an additional 16 minutes.

Then 296.4 grams of vinyl acetate and 63.2 grams of butyl acrylate were added as a mixture over a 157 minute period (a 2.5 cc/min feed rate). During the same period 50 grams of t-butyl hydroperoxide (0.1875% aqueous solution) and 50 grams of sodium formaldehyde sulfoxylate (0.1875% aqueous solution) were added over a 157 minute period (a feed rate of 0.316 cc/min). A catalyst composed of 5 grams of 3% t-butyl hydroperoxide and 5 grams of 3% aqueous sodium formaldehyde sulfoxylate was added and the mixture was heated an additional sulfoxylate was added and the mixture was heated an additional 24 minutes at 65° C. The product was cooled to ambient temperature and stored in a glass container.

The hydrophobic polymer coating had a number average molecular weight of 90,000 and the product had an Encapsulation Efficiency of 95%, passed 1200 scrub cycles and exhibited a 21.8% better $TiO_2$ Scattering Coefficient (by the procedure disclosed in National Bureau of Standards Research Paper No. 1026) than a paint based commercial latex UCAR 376 when both contained 2 pounds of titanium dioxide per gallon.

EXAMPLES 22 to 28

In these examples the following general procedure is used. A pigment grind is prepared by premixing 218.81 grams of water, 6 grams of the below noted amphiphilic polymer, 68.57 grams of TAMOL TM SG-1, 20.0 grams of DeeFo TM 495, and 368.44 grams of propylene glycol. To the premix is added 2000 grams of TiPure TM R-900 titanium dioxide while the premix is under agitation in a Cowles mixer. The mixing seed is increased from about 1900 to 4900 rpm during the addition. The grinding continues for about 30 minutes at about 4900 rpm. The resulting grind is then diluted with about 491 grams of water and 18 grams of the below noted amphiphilic polymer.

A vinyl acrylic monomer solution is prepared by mixing 767.2 grams of water, 128.58 grams of Igepal TM C0997. This mixture is then added to about 1436 grams of the pigment grind and mixed thoroughly for about 30 minutes at ambient temperature. This mixture, while being mixed at a rate sufficient to maintain a vortex or about 250 rpm, is gradually heated to about 65° C. During this heating process 135 grams of vinyl acetate, 60 grams of a 3 percent aqueous t-butyl hydroperoxide solution and 60 grams of a 3 percent aqueous sodium formaldehyde sulfoxylate solution are added. Once this reaction mixture reaches 65° C. it is maintained under the agitation for about 30 minutes and then a mixture of vinyl acetate and butyl acrylate (in an approximate weight ratio of 5:1) is added at a feed rate of about 11.8 milliliters per minute for about 70 minutes. Starting at the same time an equal weight aqueous mixture of t-butyl hydroperoxide and sodium formaldehyde sulfoxylate (both at 3% concentration) are added at a feed rate of about 1.5 milliliters per minute for a period of about 100 minutes. After all monomer and catalyst are added, the reaction mixture is maintained at 65° C. for about 30 minutes. Table XI provides a summary of examples 22 to 28

TABLE XI

| Example | Associative Thickener | % Hiding Power over Steig Calculation | Ambient Stability at 8 mo. | Encapsulation Efficiency, % | Scrub Resistance |
|---|---|---|---|---|---|
| 22 | A. T. I | 30 | — | 80 | 104 |
| 23 | Cellulosic[a] | 35 | — | 74 | 198 |
| 24 | A. T. II[b] | 38 | — | 90 | 205 |
| 25 | A. T. III[c] | 17 | — | 46 | 121 |
| 26 | A. T. IV[d] | 26 | — | 44 | 175 |
| 27[e] | Cellulosic[f] | 37 | — | 41 | 103 |
| 28[e] | Cellulosic[g] | 29 | — | 50 | 146 |

Footnotes:
[a] A hydrophobized cellulosic thickener available as Natrasol Plus TM from Hercules Inc., Wilmington, Delaware.
[b] An ethoxylated polymer having pendant nonylphenol groups available as QR-708 from Rohm and Haas Company, Philadelphia, Pennsylvania.
[c] An associative thickener silimar to A. T. I except that the hydrophobic groups are lauryloxy groups and the thickener has a weight average molecular weight of about 110,000.
[d] An associative thickener similar to A. T. I except that the hydrophobic groups are lauryloxy groups and the thickener has a weight average molecular weight of about 8700.
[e] Comparative
[f] A cellulosic thickener having a viscosity of about 1100 to 1450 cps as a 1 percent by weight solution in water available as QP-15000H from Union Carbide Corporation, Danbury, Connecticut.
[g] A cellulosic thickener having a viscosity of 4800 to 5600 cps as a 2 percent by weight solution in water available as QP-4400H from Union Carbide Corporation, Danburry, Connecticut.

EXAMPLES 29 to 31

In these examples the following general procedure is used. A pigment grind is prepared by premixing 980.25 grams of water and 42.9 grams of Tamol TM SG-1. To the premix is added 2500 grams of TiPure (TM) R-900 titanium dioxide while the premix is under agitation in a Cowles mixer. The mixing speed is increased from about 1900 to 4900 rpm during the addition. The grinding continues for about 30 minutes at about 4900 rpm. The resulting grind is then diluted with about 250 grams of water and 357.1 grams of Tergitol TM NP-70.

A vinyl acrylic monomer solution is prepared by mixing 318 grams of water, 32.2 grams of Tergitol TM NP-70 for examples 29 and 30 only and 7.20 grams of sodium acetate (25% aqueous solution) for examples 29 and 31 only. This mixture is then added to about 740 to 750 grams of the pigment grind and the amphiphilic polymer, if any, as noted below, and mixed thoroughly for about 30 minutes at ambient temperature. This mixture, while being mixed at about 250 rpm, is gradually heated to about 65° C. During this heating process 67.5 grams of vinyl acetate, 10 grams of a 3 percent aqueous t-butyl hydroperoxide solution and 10 grams of a 3 percent aqueous solution of sodium formaldehyde sulfoxylate are added. Once this reaction mixture reaches 65° C. it is maintained under the agitation for about 30 minutes and then a mixture of vinyl acetate and butyl acrylate (in an approximate weight ratio of 5:1) is added at a feed rate of about 4.6 milliliters per minute for about 90 minutes. Starting at the same time an equal weight aqueous mixture of t-butyl hydroperoxide and sodium formaldehyde sulfoxylate (both at 3% concentration) are added in separate streams at a feed rate of about 25 milliliters per minute for a period of about 120 minutes. After all monomer and catalyst are added, the reaction mixture is maintained at 65° C. for about 30 minutes. Table XII provides a summary of these examples.

TABLE XII

| Example | Associative Thickener | Amount of Associative Thickener, g | Other Additives | Amount of Other Additives, g | % Hiding Power over Steig Calculation | Ambient Stability at 8 mo. | Encapsulation Efficiency, % |
|---|---|---|---|---|---|---|---|
| 29[a] | None | | Sodium Acetate | 1.8 (dry) | 22 | Marginal | 99 |
| 30 | A. T. I | 6.75 | | — | 26 | Stable | 83 |
| 31 | A. T. I | 6.75 | Sodium Acetate | 1.8 (dry) | 22 | Marginal | 103 |

Footnotes:
[a]Comparative
NP-70 is 70% aqueous solution of a nonylphenol ethoxylate having an average molecular weight of about 3300 and available from Union Carbide Corporation, Danbury, Conencticut.

EXAMPLES 32 to 34

In these examples the following general procedure is used. A pigment grind is prepared by premixing 700 grams of water and 111.54 grams of TAMOL TM SG-1. To the premix is added 3250 grams of TiPure (TM) R-900 titanium dioxide while the premix is under agitation in a Cowles mixer. The mixing speed is increased from about 1900 to 4900 rpm during the addition. The grinding continues for about 30 minutes at about 4900 rpm. The resulting grind is then diluted with about 907.13 grams of water and 464.23 grams of Tergitol TM NP-70.

A vinyl acrylic monomer solution is prepared by mixing 320 grams of water and, 32.2 grams of Tergitol TM NP-70 (for Examples 32 and 33 only). This mixture is then added to about 750 grams of the pigment grind and amphiphilic polymer, if any, as noted below. In Example 33, 7.2 grams of a 25 weight percent aqueous solution of sodium acetate are also added. This composition is mixed thoroughly for about 30 minutes at ambient temperature. This mixture, while being mixed at about 250 rpm, is gradually heated to about 65° C. During this heating process 67.5 grams of vinyl acetate, 10 grams of a 3 percent aqueous solution of t-butyl hydroperoxide and 35 grams of a 3 percent aqueous solution of sodium formaldehyde sulfoxylate are added. Once this reaction mixture reaches 65° C. it is maintained under the agitation for about 30 minutes and then a mixture of vinyl acetate and butyl acrylate (in an approximate weight ratio of 5:1) is added at a feed rate of about 4.58 milliliters per minute for about 90 minutes. Starting at the same time 3 weight percent aqueous solution of t-butyl hydroperoxide is added at a feed rate of about 0.21 milliliters per minute for a period of about 120 minutes. After all monomer and catalyst are added, the reaction mixture is maintained at 65° C. for about 30 minutes. Table XIII provides a summary of these examples.

carbitol solution (90/10 parts on a weight basis) which optionally contains the weight percent of component B set forth in Table XIV, 5 grams of acetic acid, 10 grams of DeeFo(TM) 495, and 225 grams of distilled water and the components are mixed using a Cowles Mixer operating at about 1000 rpm for about 5 minutes. The speed of the mixer is increased to about 5000 rpm and then 2000 grams of TiPure(TM) R-900 titanium dioxide are slowly added in increments of about 200 grams. The mixing is continued for about 30 minutes after addition of the titanium dioxide and the pigment grind yields a reading of about 7 on the Hegman gauge. This slurry is referred to as the pigment grind for examples 35 to 45 and various portions are used in the following procedures.

A pigment grind for use in Examples 46 to 60 is prepared as follows. The stainless steel beaker is charged with about 450 grams of water, 34.3 grams of Tamol TM SG-1, and 20 grams of DeeFo TM 495. This mixture is stirred using a Cowles Mixer and about 2000 grams of TiPure TM R-900 titanium dioxide are slowly added while increasing the mixing speed to about 4500 rpm. About 30 grams of water are added to improve stirring. The mixture is stirred for an additional 30 minutes and about 30 grams of A.T. I and about 563 grams of water are added while the mixture is being stirred. The mixture is then stirred for an additional 30 minutes. Portions of this pigment grind are used in the procedure of Examples 46 to 60.

The following procedure is used for encapsulation in Examples 35 to 47. A three liter flask fitted with a water reflux condenser/nitrogen outlet, mechanical stirrer, thermocouple, nitrogen inlet, initiator feed lines and monomer feed line is used to achieve encapsulation. The flask is charged with about 623.3 grams of the pigment grind (70 weight percent solids), about 142 grams of distilled water and a 10 weight percent aqueous solution of component C in the amounts identified in Table XIV. The mixture is maintained under nitrogen

TABLE XIII

| Example | Associative Thickener | Amount of Associative Thickener, g | Other Additives | % Hiding Power over Steig Calculation | Ambient Stability at 8 mo. | Encapsulation Efficiency, % |
|---|---|---|---|---|---|---|
| 32[a] | None | | | 20 | Marginal | 29 |
| 33 | A. T. I | 6.75 | Sodium Acetate | 24 | Stable | 62 |
| 34 | A. T. I | 6.75 | | 22 | Marginal | 62 |

Footnotes:
[a]Comparative
NP-70 is 70 weight percent aqueous solution of a nonylphenol ethoxylate having an average molecular weight of about 3300 and available from Union Carbide Corporation, Danbury, Connecticut.

EXAMPLE 35 to 60

A pigment grind for use in Examples 35 to 45 is prepared as follows. A stainless steel beaker is charged with about 400 grams of an aqueous solution containing 10 weight percent ethoxylate A as identified in Table XIV below, about 306.3 grams of an aqueous butyl purge at a stirring rate sufficient to maintain a slight vortex for the encapsulation. Monomer (vinyl acetate/butyl acrylate in about a 5.7:1 weight ratio) is provided to the flask at a feed rate of about 2.35 grams per minute for about 180 minutes. An aqueous solution of 0.4 weight percent t-butyl hydroperoxide and an equal weight amount of an aqueous solution of 0.4 weight percent sodium formaldehyde sulfoxylate are fed into the reactor in about 15 minutes (about 100 grams of combined solution). The temperature of the mixture is initially about 55° C. and is allowed to increase to about 65° C. After the initial monomer and catalyst feed, an additional 50 grams of each of the t-butyl hydroperoxide and sodium formaldehyde sulfoxylate solutions are fed to the mixture, each at a rate of about 0.25 grams per minute. After the second addition of catalyst, the mixture is continued to be stirred for about 30 minutes at 65° C. Thereafter a further charge of catalyst (5 grams of a 3 weight percent aqueous solution of t-butyl hydroperoxide and 5 grams of a 3 weight percent aqueous solution of sodium formaldehyde sulfoxylate) is made and the mixture is maintained at about 65° C. for an additional 15 minutes.

The following procedure is used for encapsulation in Examples 48 to 60. A three liter flask fitted with a water reflux condenser/nitrogen outlet, mechanical stirrer, thermocouple, nitrogen inlet, initiator feed lines and monomer feed line is used to achieve encapsulation. The flask is charged with about 704 grams of the pigment grind (65 weight percent solids) and the material(s) identified as component C in Table XIV. The mixture is maintained under nitrogen purge at a stirring rate sufficient to maintain a slight vortex for the encapsulation. The mixture is heated to 45° C. The reaction temperature is controlled using a heated water bath. About 67.5 grams of vinyl acetate is charged to the flask. As the reaction temperature is raised to 50° C., about 22 grams of an aqueous solution of 3 percent t-butyl hydroperoxide is fed into the reactor in about 15 minutes. The reactor temperature is raised to 55° C. and about 22 grams of an aqueous solution of 3 percent sodium formaldehyde sulfoxylate is fed into the reactor within 10 minutes. The mixture is heated to 65° C. and maintained at this temperature for 30 minutes. Monomer (vinyl acetate/butyl acrylate in a 6:1 weight ratio) is provided to the flask at a feed rate of about 3.19 grams per minute for about 120 minutes. About 40 grams of an aqueous solution of 1 percent t-butyl hydroperoxide and 40 grams of a similar solution of sodium formaldehyde sulfoxylate are fed to the mixture of a rate of about 0.27 grams per minutes. After complete addition of the initiator solutions the mixture is maintained at 65° C. for 30 minutes.

The examples are summarized in Table XIV.

TABLE XIV

| | In Pigment Grind | | | | In Encapsulation Process | | | | |
|---|---|---|---|---|---|---|---|---|---|
| Example | Ethoxylate A | Amount, g | Component B | Amount, g | Component C | Amount, g | One Day Stability | 30 Day Stability | Encapsulation Efficiency, % |
| 35 | DB$^a$ | 153.1 | — | — | BNP$^b$ | 84.9 | Good | Good | 58.5 |
| 36 | DB | 306.3 | — | — | BNP | 45.3 | Good | Good | 99.2 |
| 37 | DB | 306.3 | BNP | 400 | — | — | Good | Good | 82.7 |
| 38 | DB | 306.3 | — | — | BNP | 84.6 | Good | Good | 131.0 |
| 39 | DB | 306.3 | BNP | 400 | BNP | 42.3 | Good | Good | 97.5 |
| 40 | DB | 153.1 | BNP | 200 | — | — | Very Poor | — | v.h.$^o$ |
| 41 | DB | 153.1 | BNP | 200 | BNP | 42.6 | Very Poor | — | v.h. |
| 42 | DB | 612.5 | BNP | 200 | | | Good | Good | 104.3 |
| 43 | DB | 612.5 | BNP | 200 | DB | 64.8 | Good | Good | 93.9 |
| 44 | DB | 306.3 | BNP | 400 | DB | 64.8 | Good | Good | 96.7 |
| 45 | DB | 612.5 | BNP | 200 | BNP | 85.9 | Good | Good | 90.6 |
| 46 | A.T.I | — | | | DB | 194.4 | Good | Good | 96.6 |
| | | | | | BNP | 42.3 | | | |
| 47 | A.T.I | — | | | DB | 129.6 | Good | Good | 100.8 |
| | | | | | BNP | 84.6 | | | |
| 48 | A.T.I | — | | | DB$^c$ | 457 | Good | Good | 99.8 |
| | | | | | BNP$^d$ | 4.53 | | | |
| 49 | A.T.I | — | | | DB$^e$ | 457 | Good | Good | 100.6 |
| | | | | | BNP$^d$ | 9.05 | | | |
| 50 | A.T.I | — | | | DB$^f$ | 477 | Marginal | — | 92.2 |
| | | | | | BNP$^d$ | 4.53 | | | |
| 51 | A.T.I | — | | | DB$^c$ | 457 | Marginal | — | 90.0 |
| | | | | | IGEPAL CO 997 | 4.5 | | | |
| 52 | A.T.I | — | | | DB-40$^g$ | 137 | Poor | — | v.h. |
| 53 | A.T.I | — | | | DB-70$^h$ | 137 | Poor | — | v.h. |
| 54 | A.T.I | — | | | DB-100$^i$ | 137 | Good | Good | 106.3 |
| 55 | A.T.I | — | | | DB-100x$^j$ | 132 | Good | Good | 98.7 |
| 56 | A.T.I | — | | | DB-120$^k$ | 477 | Good | Good | 100.6 |
| 57 | A.T.I | — | | | DB-76$^l$ | 130 | Poor | — | v.h. |
| 58 | A.T.I | — | | | DB$^c$ | 450 | Poor | — | v.h. |
| 59 | A.T.I | — | | | PBNP-L$^m$ | 137 | Marginal | — | 99.7 |
| 60 | A.T.I | — | | | PBNP-H$^n$ | 137 | Poor | — | v.h. |

Footnotes:
$^a$DB is a solution containing bisnonylphenol terminated ethoxylate urethane having the structure

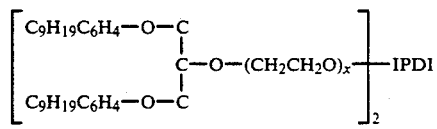

wherein x is about 120 and IPDI is the reaction residue from isophorone diisocyante. DB is provided as a 10 percent by weight solution in a 90/10 (weight parts) of water/butyl carbitol.
$^b$BNP is a solution containing bisnonylphenol terminated ethoxylate having the structure

TABLE XIV-continued

|  | In Pigment Grind | | | In Encapsulation Process | | | | |
|---|---|---|---|---|---|---|---|---|
| Example | Ethoxylate A | Amount, g | Component B | Amount, g | Component C | Amount, g | One Day Stability | 30 Day Stability | Encapsulation Efficiency, % |

$$C_9H_{19}C_6H_4-O-\underset{\underset{C_9H_{19}C_6H_4-O-C}{|}}{\overset{C}{\underset{|}{C-O-(CH_2CH_2O)_x-H}}}$$

wherein x is about 120. BNP Is provided as a 10 weight percent aqueous solution.
[c]Provided as a 2 weight percent solution in 90/10 weight parts water/butyl carbitol.
[d]Provided as solid ethoxylate.
[e]Provided as a 1 weight percent solution in 95/5 weight parts water/butyl carbitol.
[f]Provided as a 0.95 weight percent solution in 90/10 weight parts water/butyl carbitol.
[g]DB-40 is a solution containing bisnonylphenol terminated urethane having the structure
$[C_9H_{19}C_6H_4-O-(CH_2CH_2O)_x]_2-IPDI$
wherein x is about 40. DB-40 is provided as a 35 weight percent aqueous solution.
[h]DB-70 is a solution similar to DB-40 except x is about 70.
[i]DB-100 is a solution similar to DB-40 execpt x is about 100.
[j]DB-100x is similar to DB-100 except instead of IPDI, the urethane moiety is based on DESMODUR TM N3390, a trifunctional aliphatic isocyanate available from Mobay Chemical Co., Pittsburgh, Pennsylvania, and three ethoxylate chains extend from the urethane moiety.
[k]DB-120 is a solution similar to DB except that x is about 120 and the solution a 4.7 weight percent solution in 80/20 parts by weight water/butyl carbitol.
[l]DB-76 is a solution similar to DB except x is abount 76 and the solution is a 17.8 weight percent solution in 90/10 parts by weight water/butyl carbitol.
[m]PBNP-L is a solution of a low molecular weight ethoxylated urethane polymer having the structure $$\left[ C_9H_{19}-O-\underset{\underset{C_9H_{19}-O-C}{|}}{\overset{C}{\underset{|}{C-O-(CH_2CH_2O)_{160}-IPDI}}} \right]_n$$

The number average molecular weight is about 20,000. The solution is about 17.5 weight percent in 80/20 parts by weight of water/butyl carbitol.
[n]PBNP-H is a solution similar to PBNP-1 except that the polymer is higher molecular weight, i.e., about 50,000 on a number average molecular weight basis.
[o]The Encapsulation Efficiency of these Examples is believed to be very high, e.g., approaching 100 percent. Since the dispersion of the particles is not stable, difficulties exist in precisely determining the Encapsulation Efficiency.

What is claimed is:

1. A process for preparing stable aqueous dispersions of water-insoluble particulate solids said particles having a surface capable of adsorbing hydrophilic polymers and having a coating of a hydrophobic polymer adhering to said surface thereof comprising the steps of forming a dispersion of the particulate solids in water in the presence of a polymeric associative thickener in an amount sufficient to provide particle stabilization and to create a hydrophobic zone at said surface, said associative thickener comprising a polymer having a weight average molecular weight of at least about 10,000 and, in the average molecule, a hydrophilic backbone and an average of more than one pendant hydrophobic group connected to said hydrophilic backbone and polymerizing at least one monomer polymerizable to a hydrophobic polymer in said aqueous dispersion of particulate solids in the presence of said polymeric associative thickener and a sufficient amount of a nonionic surfactant, having a hydrophilic portion with up to a maximum of about 150 ethylene oxide groups, to form a stable aqueous dispersion of the particulate solids in which at said surface having the hydrophobic zone the particles thereof are coated with the hydrophobic polymer formed by the polymerization whereby the resulting dispersion is stable and capable of providing dried films having improved hiding power compared to dried films made from dispersions without said associative thickener.

2. Process as claimed in claim 1 wherein said associative thickener comprises bunched hydrophobic groups connected to said hydrophilic backbone.

3. Process as claimed in claim 2 wherein said polymeric associative thickener has the formula:

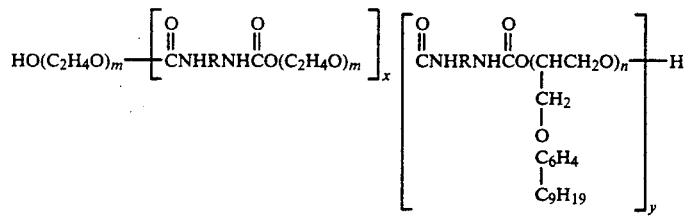

wherein R is a divalent organic group selected from the class consisting of alkylene, arylene, alkenylene, alkarylene, aralkylene, cycloalkylene and cycloalkenylene; m is a number having an average value of about 90 to about 320; n is a number having an average value at least about 1; x is a number having an average value greater than about 1, and y is a number having an average value greater than about 1.

4. Process as claimed in claim 3 wherein R is a cycloalkylene group having the formula:

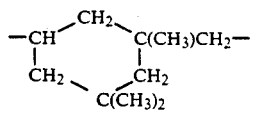

m has an average value of about 180 to about 230; n is a number having an average value greater than about 1 up to about 30; x has an average value of about 5 to about 25, and y has an average value of greater than about 1 to about 20.

5. Process as claimed in claim 1 wherein said polymeric associative thickener is present in an amount of about 0.01 to about 5% by weight of the particulate solids and said non-ionic surfactant is present in an amount of about 1 to about 20% by weight of the particulate solids.

6. Process as claimed in claim 1 wherein said hydrophobic groups of said polymeric associative thickener are terminal hydrophobic groups.

7. Process as claimed in claim 1 wherein high shear mixing is used in forming said dispersion.

8. Process as claimed in claim 1 wherein said steps of forming a dispersion and polymerizing are carried out concurrently in the same vessel.

9. Process as claimed in claim 1 wherein said dispersion is formed in the presence of at least one anionic dispersant in an amount of about 0.1 to about 10% by weight of the particulate solids.

10. Process as claimed in claim 1 wherein said non-ionic surfactant comprises a hydrophilic chain and one hydrophobic end group per molecule.

11. Process as claimed in claim 1 wherein said dispersing step is carried out in the presence of up to 50% by weight of the particulate solids of propylene glycol.

12. Process as claimed in claim 1 wherein said dispersing and polymerizing steps are carried out in the presence of up to 50% by weight of the particulate solids of propylene glycol.

13. Process as claimed in claim 1 wherein said particulate solids are TiO$_2$ particles.

14. Process as claimed in claim 9 wherein said anionic dispersant comprises an acrylic polymer having a carbon to carbon backbone and pendant carboxyl-containing groups and carboxylate ester-containing groups attached to said backbone.

15. Process as claimed in claim 1 wherein said hydrophobic polymer is formed by copolymerizing vinyl acetate and tert-butyl acrylate.

* * * * *